United States Patent [19]

Becker et al.

[11] 4,230,680

[45] Oct. 28, 1980

[54] LOW ENERGY PROCESS FOR SYNTHESIS OF AMMONIA

[75] Inventors: Colman L. Becker; Joseph R. LeBlanc, both of Houston, Tex.

[73] Assignee: Pullman Incorporated, Chicago, Ill.

[21] Appl. No.: 925,138

[22] Filed: Jul. 17, 1978

[51] Int. Cl.² ............................................. C01C 1/04
[52] U.S. Cl. ..................................... 423/360; 423/361
[58] Field of Search ................................ 423/359–363

[56] References Cited

U.S. PATENT DOCUMENTS

| | | | |
|---|---|---|---|
| 3,395,982 | 8/1968 | Didycz | 423/360 |
| 3,556,738 | 1/1971 | Schober | 423/360 |
| 3,694,169 | 9/1972 | Fawcett et al. | 423/360 |
| 3,721,532 | 3/1973 | Wright et al. | 423/361 |
| 3,957,449 | 5/1976 | Ciechowski | 423/360 |
| 4,088,740 | 5/1978 | Gaines | 423/361 |
| 4,101,281 | 7/1978 | Pagani | 423/360 |

FOREIGN PATENT DOCUMENTS

| | | | |
|---|---|---|---|
| 788908 | 7/1968 | Canada | 423/361 |
| 1204634 | 9/1970 | United Kingdom | 423/361 |

*Primary Examiner*—Wayne A. Langel
*Attorney, Agent, or Firm*—Kurt S. Myers; C. W. Crady

[57] ABSTRACT

An improved process for the synthesis of ammonia utilizing three catalyst beds wherein the temperature of the synthesis feed gas and the effluent of at least one of the catalyst beds is controlled without the addition of quench gas.

11 Claims, 1 Drawing Figure

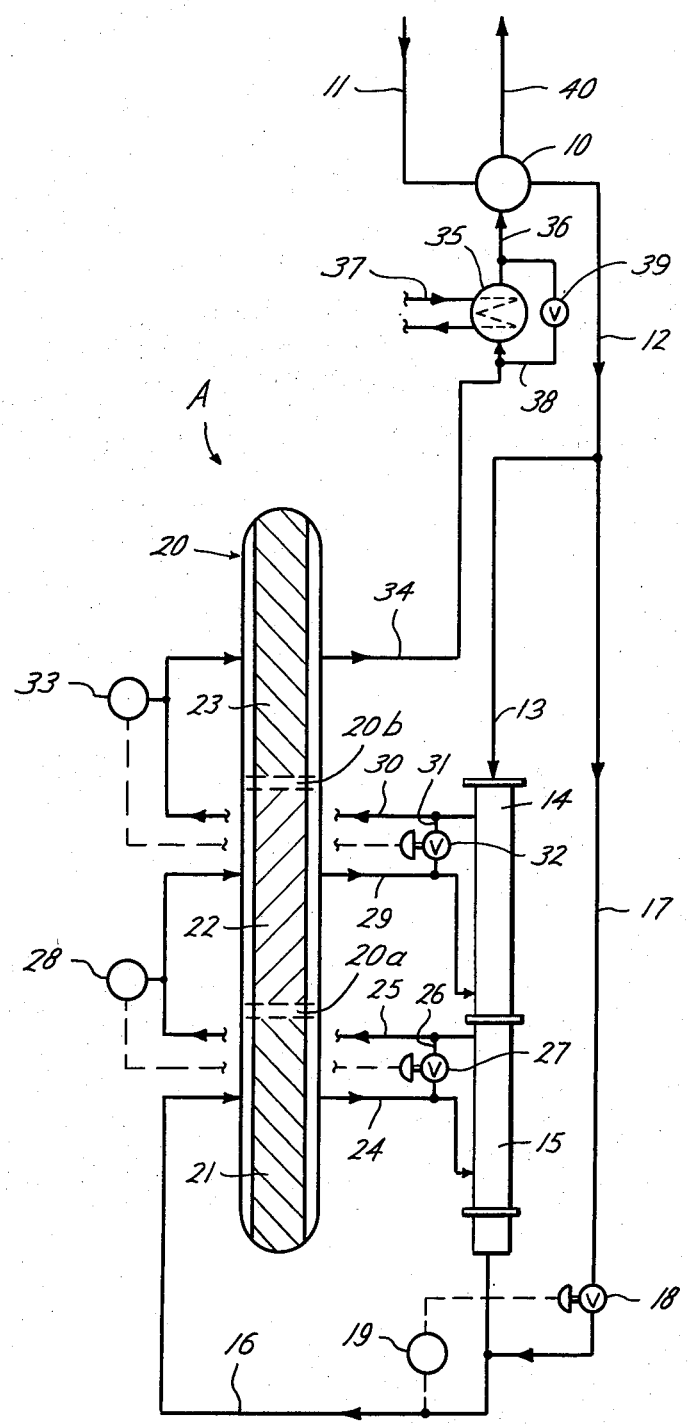

4,230,680

LOW ENERGY PROCESS FOR SYNTHESIS OF AMMONIA

CROSS REFERENCE TO RELATED PATENT APPLICATION

This application is related to United States Pat. application Ser. No. 925,137, which is entitled "Radial Ammonia Converters" and was filed on the same date as this application.

BACKGROUND OF THE INVENTION

1. Field of the Invention

This invention relates to the synthesis of ammonia.

2. Prior Art

A book entitled "Ammonia Part III", edited by A. V. Slack and G. Russell James, published by Marcel Decker, Inc., 1977, describes the commercial ammonia processes of fourteen (14) companies in Chapter 9, pages 291 to 369 inclusive. Most of the commercial processes use a quench type ammonia converter. In a quench type converter, the synthesis gas is passed through a plurality of catalyst beds with a part of the synthesis gas being directed and admixed with the effluent from the catalyst beds to cool the effluent before passing to the next catalyst bed. The disadvantage of this type of ammonia converter is that all of the synthesis gas does not pass through all of the catalyst beds. Quench type converters are also disclosed in U.S. Pat. Nos. 3,784,361; 3,372,988; 3,567,404; 3,694,169; 3,475,136; publications "Radial Converter Shows Big Benefits for Ammonia", Petroleum International, Nov. 1974, Vol. 14, No. 11, pp. 72–76; and Nitrogen, May/June 1976, Vol. No. 101, pp. 42–43. Radial type ammonia converters of Topsoe are also disclosed as having one or two catalyst beds (FIG. 26, Topsoe singular bed radial converter and FIG. 27, Topsoe two bed radial converter) on pages 346 and 347 of the book "Ammonia Part III" referred to hereinabove. All of these Topsoe converters appear to utilize quench gas, at least in part, to control the temperature of catalyst bed effluent. The use of secondary feed and recycled effluent mixing is disclosed in U.S. Pat. Nos. 3,918,918; 3,998,932; and, 3,941,869.

The book "Ammonia Part III" also discloses ammonia converters having indirect heat exchange between catalyst beds, however, in each of these designs, the synthesis gas is passed downwardly or axially through the beds (FIG. 12, OSW Ammonia Converter, Page 315) which causes large pressure drops. Synthesis gas flow is also axial in the Braun process as discussed on pp. 364–365, FIG. 39, of the book. See also, *Nitrogen*, No. 100, March/April, 1976.

The ammonia synthesis pressure of all of the ammonia commercial processes disclosed in the "Ammonia Part III" book are in excess of 150 atmospheres and in most cases exceed 200 atmospheres. On page 354, it is stated that "[T] the present trend of design of ammonia plants is to higher loop pressure in order to get higher ammonia conversion per pass in the converter." The only disclosure of 100 atmospheres for ammonia synthesis is in regard to certain developmental work of the mid 1920's, although it is stated that the plants using this work were all built with 150 atmospheres as the ammonia synthesis pressure. Synthesis pressures of 1 to 68 atmospheres are incidentally disclosed in U.S. Pat. No. 2,550,389, and pressures of 20 to 400 atmospheres are disclosed in U.S. Pat. No. 3,957,449, although no commercial plant is known which operates at low pressures, i.e. less than 100 atms. Patents of general interest include U.S. Pat. Nos. 3,279,153; 3,031,274; 3,754,078; and, Great Britain Pat. No. 1,115,952.

SUMMARY OF THE INVENTION

The present invention is directed to a process for the synthesis of ammonia utilizing three catalyst beds wherein the temperature of the synthesis feed gas entering a first catalyst bed and of the effluent entering second and third catalyst beds is controlled by varying the relative volumes of effluent passing through and bypassing the heating stages in order to optimize ammonia production. As part of the process of this invention, there is full flow of the synthesis gas through all three catalyst beds, meaning all the synthesis gas feed passes through the first catalyst bed, all the effluent from the first catalyst bed passes through the second catalyst bed and all the effluent from the second catalyst bed passes through the third catalyst bed. Thus, the process for the synthesis of ammonia of this invention includes the steps of passing the synthesis gas comprising essentially hydrogen and nitrogen in a ratio of approximately 3 to 1 through a plurality, preferably three, heat exchanger stages in series to heat the synthesis gas to a first reaction temperature. The synthesis feed gas at the first reaction temperature is then passed through a first catalyst bed wherein a catalytic, exothermic reaction occurs to produce a first effluent which includes ammonia. A portion of the first effluent is passed through a heat exchanger stage or interchanger in order to heat the synthesis gas and cool the first effluent, and the cooled portion of the first effluent is then mixed with the remainder of the first effluent to thereby reduce the temperature of the first effluent to a second reaction temperature prior to entry into the second catalyst bed. The first effluent at the second reaction temperature is passed through the second catalyst bed and the hydrogen and nitrogen therein is exothermically reacted to produce a second effluent containing additional ammonia. A portion of this second effluent is passed through a heat exchanger stage or second interchanger to heat the synthesis gas and cool the second effluent, and the cooled portion of the second effluent is then mixed with the remainder of the second effluent to reduce the temperature of the second effluent to a third reaction temperature prior to passage to the third catalyst bed. The second effluent at the third reaction temperature is passed through the third catalyst bed and the hydrogen and nitrogen therein is exothermically reacted to produce a third effluent containing additional ammonia. The third catalyst bed effluent is then processed for recovery of the ammonia. The temperature of the synthesis feed gas entering the first catalyst bed and of the effluent entering the second and third catalyst beds is controlled by varying the relative volumes of effluent passing through and bypassing the heat exchanger stages in order to optimize ammonia production under conditions which may change over a period of time.

DESCRIPTION OF THE PREFERRED EMBODIMENT

Referring to the drawing, the letter A generally designates the apparatus for performing the process of this invention for producing ammonia from a synthesis gas feed. Preparation of the synthesis gas feed, which is a gas mixture of hydrogen and nitrogen, may be carried out in a variety of known ways. Natural gas or naphtha may be steam reformed to produce the hydrogen and nitrogen mixture; also, the synthesis feed gas can be produced by partial oxidation of fuel oils or coal or by simply mixing hydrogen and nitrogen from separate sources. In any event, the synthesis mixture is a mixture consisting essentially of hydrogen and nitrogen in approximately a 3 to 1 ratio. For best results, these two gases would be the only gases present, although in most commercial operations, small amounts of other gases are present.

In general, according to the present invention, the synthesis of ammonia is carried out in three catalyst beds wherein the exothermic ammonia synthesis reaction occurs to produce effluent containing ammonia. The process of this invention is designed so that the temperature conditions of synthesis gas and catalyst effluent may be optimized under changing conditions within the catalyst beds or the heat exchanger stages. Such temperature control is attained, without resorting to the use of quench gas, by cooling a portion of the effluent from each catalyst bed and mixing the cooled portion with the remainder of the effluent prior to entry into the next catalyst bed.

In designing an ammonia plant, the desired plant capacity, the plant location and economic considerations are the primary factors which determine the catalyst volume and gas flow for a specific plant. Thus, these factors are not part of the present invention as such but do have an effect on the specific inlet temperature to the catalyst beds and actual yield of ammonia produced in each catalyst bed in regard to a specific plant. Using the process of the present invention in a specific plant, the total temperature rise realized through all three catalyst beds is maximized to maximize ammonia production. To obtain the total temperature rise maximization, it is not simply a judicious selection of inlet temperatures to each catalyst bed that is required, but a control mechanism and process design which allows the maximum ammonia production to be achieved. The present invention is such a control mechanism and process design. Certain inlet temperatures may be selected in the design, assuming certain catalyst conditions; but in reality, catalyst conditions change. For example, over a period of time, the catalyst may become dirty due to the formation of carbon deposits on individual catalyst particles. Changes in the condition of the catalyst adversely affects the efficiency of ammonia formation within such catalyst beds; and accordingly, changes in process conditions need to be made, for example, higher temperatures of synthesis gas may be required to maintain optimum ammonia formation when the catalyst becomes less active. Under the process of this invention, ammonia production is optimized by adjusting the temperature of the synthesis gas and effluents while maintaining full flow of the synthesis gas. In addition to optimizing for changes in catalyst conditions, the process of the present invention provides a means to optimize conditions when recycling of gas is minimized at reduced production levels.

In the preferred embodiment, the apparatus A includes a first heat exchanger stage 10 which may be a heat exchanger adapted to receive on the tube side synthesis feed gas from incoming line 11. The exchanger 10 is used to partially raise the synthesis feed gas to a first reaction temperature as the synthesis feed gas flows into line 12. The synthesis gas from feed line 12 passes through line 13 and then the tube side of a first process heat exchanger 14 in the preferred embodiment. The heated synthesis gas is heated further in another heat exchanger 15 and exits through line 16. A bypass line 17 connects line 12 to heat exchange exit line 16 and includes a control valve 18 for controlling the volumetric amount of gas flow which bypasses the heat exchangers 14 and 15. Temperature monitoring instrumentation 19 (e.g. a thermocouple) is mounted in exit line 16 and is operably connected to the control valve 18 mounted in line 17 in order to control the volume of feed gas which proceeds directly from line 12 to line 16. Thus, the synthesis feed gas is raised to a first reaction temperature.

The heated synthesis gas is directed from line 16 into the ammonia converter(s) 20. The ammonia converter(s) 20 is schematically shown (the number of vessels may be one or two or even three) but will include three catalyst beds: first catalyst bed 21; second catalyst bed 22 and third catalyst bed 23. Each catalyst bed is annular such that the synthesis gas passes radially therethrough. Each catalyst bed is separate from the other as illustrated schematically at 20a and 20b. The types of catalyst utilized in catalyst beds 21, 22, and 23 may be the iron and promoted iron catalyst which are well-known in the art. The small sized catalyst (1.5–6mm) is preferred.

The synthesis gas which has been heated to a first reaction temperature of between 315° and 400° C. enters the first catalyst bed 21 through line 16 and passes radially through catalyst bed 21. As the synthesis gas passes through the catalyst bed 21, an exothermic reaction occurs to produce an effluent containing 4 to 8% ammonia depending on the specific plant design. The first effluent passes outwardly through first catalyst bed exit line 24. The first catalyst bed exit line 24 may be connected to the shell side of the heat exchanger 15. A portion of the first effluent is cooled in heat exchanger 15 and passes outwardly through exit line 25. The cooled first effluent is passed by line 25 to the second catalyst bed 22.

A bypass line 26 having bypass valve 27 mounted therein is attached to the first catalyst bed exit line 24 and to the heat exchanger exit line 25. Temperature controlling instrumentation 28 is mounted in the heat exchanger exit line 25 downstream of line 26 and is operably connected to the valve 27 in bypass line 26 to control the direct transfer of first effluent from first catalyst bed exit line 24 to the heat exchanger exit line 25, thus allowing some effluent to bypass the heat exchanger 15 as is necessary to control the temperature of the effluent entering the second catalyst bed 22 so that the effluent enters the second catalyst bed 22 at a second reaction temperature which is attained as a result of the mixing of the portion of the first catalyst bed effluent cooled in heat exchanger 15 and the remainder which bypasses the heat exchanger through line 26. If at any time the condition of the catalyst in bed 22 requires that the second reaction temperature be higher, less of the effluent portion is passed through the heat exchanger 15 and more of the effluent gas flows through the bypass line 26 directly to line 25 thereby raising the second reaction temperature.

The first effluent which is maintained at a second reaction temperature of between 315° and 400° C. enters the second catalyst bed 22 through line 25 and is passed radially therethrough. The hydrogen and nitrogen in the effluent is exothermically reacted in the presence of the catalyst therein to produce a second effluent which contains between 6 and 10% ammonia, or an increase of 2 to 6% over the amount of ammonia in the first effluent. This second effluent exits the second catalyst bed through exit line 29. The exit line 29 may be connected to the shell side of heat exchanger 14 which has an exit line 30 connected to the inlet of the third catalyst bed 23.

A portion of the second effluent is cooled in heat exchanger 14 and exits the heat exchanger by line 30. A bypass line 31 having bypass valve 32 mounted therein extends between the second catalyst bed exit line 29 and the heat exchanger exit line 30 providing for the direct transfer of effluent from the second catalyst bed 22 to line 30, wherein a mixing of the bypassed effluent and the cooled effluent portion occurs to control the temperature of the second effluent entering the third catalyst bed 23. Suitable temperature control instrumentation 33 is mounted in line 30 in operative connection with the valve 32 for controlling the amount of effluent flowing through bypass line 31.

The second effluent, after mixing in line 30 of the part which has been cooled in the heat exchanger 14 and the remainder which is passed directly to third catalyst bed entry line 30 through bypass line 31, is at a third reaction temperature of between 315° and 400° C. The second effluent is then passed radially through the third catalyst bed 23 to produce a third effluent which contains between 8 and 14% ammonia, or a still further increase of ammonia over the amount in the second effluent. This third effluent exits outwardly through the third catalyst bed exit line 34. The third effluent contains ammonia gas generated from each of the three catalytic reactions. This final effluent may then be processed in a known manner for the recovery of the synthesized ammonia. Prior to the removal of the ammonia from the effluent, the effluent from the third catalyst bed may be passed through line 34 to the shell side of a heat exchanger 35 and then into line 36 which connects the shell side of the heat exchanger 10. The heat exchanger 35 may be connected on the tube side to various plant fluid lines 37 in order to heat other fluids such as boiler feed water as is necessary or desirable. A bypass line 38 is connected between lines 34 and 36 and includes control valve 39 for bypassing the heat exchanger 35 either partially or completely. The ammonia-containing effluent in line 36 may be then passed through shell side of the heat exchanger 10 and into line 40 for direction to the subsequent recovery operations known in the art.

Therefore, the temperature of the synthesis gas and effluents is controlled in a closed loop system without the use of synthesis gas feed as quench gas. In the embodiment described, the synthesis gas may be passed through the tube side of heat exchangers 14 and 15; however, the heat exchangers 14 and 15 may utilize fluids other than the synthesis gas such as plant water to cool the first and second catalyst bed effluent. The present invention has specific application to a low pressure, low energy process. The pressure used in the process of the present invention is within a pressure range of 20 to 95 atmospheres. The synthesis pressure may range between 30 and 85 atmospheres and may specifically be about 35 atmospheres. The utilization of a lower pressure process provides a savings in energy due to a reduction in the capacity of compressors and other equipment needed to maintain the synthesis gas in the higher pressure range above 100 atmospheres. An additional energy saving concept of the present invention is the low pressure drop through the catalyst beds. Although the catalyst beds have been described as providing for radial flow to obtain a minimal pressure drop (e.g. pressure drops of less than 1 atmosphere), the flow may be a transverse or cross flow so long as the pressure drop is between about 0.5 and 3 atmospheres, e.g. 0.5–1.5 at about 35 atmospheres, from the inlet of the first catalyst bed 21 to the exit of the third catalyst bed 23.

The foregoing disclosure and description of the process of this invention is illustrative and explanatory thereof, and various changes in the size, shape and materials process may be made without departing from the spirit of the invention.

We claim:

1. A process for the synthesis of ammonia, comprising:

passing a synthesis feed gas consisting essentially of hydrogen and nitrogen in approximately a 3 to 1 ratio through at least one heat exchanger to heat said synthesis feed gas to a first reaction temperature;

passing said heated synthesis gas at said first reaction temperature through a first ammonia synthesis catalyst bed wherein an exothermic reaction occurs to produce a first effluent containing ammonia;

passing a portion of said first catalyst bed effluent through a heat exchanger to cool said effluent portion and mixing said cooled first effluent portion with the remainder of said first catalyst bed effluent to adjust the temperature of said first catalyst bed effluent to a second reaction temperature;

passing said first catalyst bed effluent at said second reaction temperature through a second ammonia synthesis catalyst bed for exothermic reaction to produce a second catalyst bed effluent containing further ammonia;

passing a portion of said second catalyst bed effluent through another heat exchanger to cool said second effluent portion and mixing said cooled second effluent portion with the remainder of said second catalyst bed effluent to adjust the temperature of said second catalyst bed effluent to a third reaction temperature; and passing said second catalyst bed effluent at said third reaction temperature through a third ammonia synthesis catalyst bed wherein an exothermic reaction occurs to produce a third effluent containing further ammonia.

2. The process of claim 1, including:

exchanging said portion of first catalyst bed effluent with said synthesis feed gas in order to at least partially heat said synthesis feed gas to said first reaction temperature simultaneously with the cooling of said first catalyst bed effluent portion.

3. The process of claim 1, including:

exchanging said portion of second catalyst bed effluent with said synthesis feed gas in order to at least partially heat said synthesis feed gas to said first reaction temperature simultaneously with the cooling of said second catalyst bed effluent portion.

4. The process of claim 1, including:

passing said synthesis feed gas at said first reaction temperature, said first catalyst effluent at said second reaction temperature and said second catalyst bed effluent at said third reaction temperature in a radial direction through said first, second and third catalyst beds, respectively.

5. The process of claim 1, wherein:
the pressure of said synthesis feed gas and said effluents of said first, second and third catalyst beds is within a range of 20 to 95 atmospheres.

6. The process of claim 1, wherein:
the pressure drops between said synthesis feed gas at said first reaction temperature and said third effluent from said third catalyst bed is within a range of 0.5 to 3 atmospheres.

7. The process of claim 1, wherein:
all of the synthesis gas is passed through said first catalyst bed, all of the effluent of the first catalyst bed is passed through said second catalyst bed and all of the effluent of said second catalyst bed is passed through said third catalyst bed.

8. The process of claim 1, wherein:
The portion of said second catalyst bed effluent passing through said heat exchanger is changed to adjust the temperature of said second catalyst bed effluent to a third reaction temperature.

9. The process of claim 1, wherein:
The second reaction temperature and the third reaction temperature are adjusted by changing the portion of first catalyst bed effluent passing through said heat exchanger and changing the portion of second catalyst bed effluent passing through said another heat exchanger, respectively.

10. A synthesis process for producing ammonia, comprising:
passing a synthesis gas consisting essentially of hydrogen and nitrogen in approximately a 3 to 1 ratio at a pressure within the range of 25 to 90 atmospheres through a series of indirect heat exchangers to heat said synthesis gas to reaction temperature;
passing said heated synthesis gas radially through a first ammonia synthesis catalyst bed, the thickness of said bed being such that the pressure drop is less than 1 atmosphere, wherein an exothermic reaction occurs to produce a first effluent containing ammonia;
passing a portion of said first effluent through one of said indirect heat exchangers to heat said synthesis gas and cool said first effluent and bypassing the remaining portion of said first effluent from passage through said indirect heat exchanger and combining said portions to control the temperature of said first effluent;
passing said cooled first effluent radially through a second ammonia synthesis catalyst bed, the thickness of said bed being such that the pressure drop is less than 1 atmosphere, wherein an exothermic reaction occurs to produce a second effluent containing ammonia;
passing a portion of said second effluent through one of said indirect heat exchangers to heat said synthesis gas and cool said second effluent and bypassing the remaining portion of said second effluent from passage through said indirect heat exchanger and combining said portions to control the temperature of said second effluent; and
passing said cooled second effluent radially through a third ammonia synthesis catalyst bed, the thickness of said bed being such that the pressure drop is less than 1 atmosphere, wherein an exothermic reaction occurs to produce a third effluent containing ammonia.

11. The process of claim 10, including:
bypassing a portion of said synthesis gas passed through at least one of said indirect heat exchangers to control the temperature of synthesis gas entering said first ammonia synthesis bed.

* * * * *